United States Patent [19]

Förster et al.

[11] Patent Number: 5,028,270
[45] Date of Patent: Jul. 2, 1991

[54] FREEZE-STABILIZED SILICA SOL AND ITS USE AS LIQUID FOR PHOSPHATE-BASED EMBEDDING COMPOSITIONS

[75] Inventors: Hans-Joachim Förster, Schwetzingen; Josef Gotzig, Da-Schauernheim; Jörg Brenn, Hockenheim; Wolfgang Tucholke, Riedstadt, all of Fed. Rep. of Germany

[73] Assignee: Giulini Chemie GmbH, Ludwigshafen, Fed. Rep. of Germany

[21] Appl. No.: 327,711

[22] Filed: Mar. 23, 1989

[30] Foreign Application Priority Data

Mar. 31, 1988 [EP] European Pat. Off. ........ 88105248.4

[51] Int. Cl.$^5$ ............................................. C04B 12/04
[52] U.S. Cl. ................. 106/603; 100/38.35; 252/313.2
[58] Field of Search ............. 252/313.2; 106/80, 38.3, 106/38.35, 603

[56] References Cited

U.S. PATENT DOCUMENTS

| | | | |
|---|---|---|---|
| 2,601,291 | 6/1952 | Horning et al. | 252/313.2 |
| 2,788,285 | 4/1957 | Lander | 106/80 |
| 4,057,525 | 11/1977 | Kikuchi et al. | 260/29.4 R |

FOREIGN PATENT DOCUMENTS 1374537 11/1974 United Kingdom .

OTHER PUBLICATIONS

Hawley, *The Condensed Chemical Dictionary*, p. 773-774, 800, 803 & 924, 1977.
Bayer-Kieselso, product brochure.

*Primary Examiner*—Mark L. Bell
*Assistant Examiner*—Deborah Jones
*Attorney, Agent, or Firm*—Spencer & Frank

[57] ABSTRACT

An aqueous silicic acid sol which is freeze-stabilized and which is useful for the production of phosphate-based embedding compositions used in dental technology, the aqueous silicic acid sol including from 25 to 50 weight percent of silicon dioxide; and from 2 to 10 weight % of a compound which is one of urea or a urea derivative and which has the general formula:

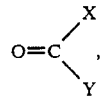

wherein X and Y are groups selected from the group consisting of an —NH$_2$ group and an —NHR group, in which R is an alkyl radical having from 1 to 4 carbon atoms.

18 Claims, No Drawings

FREEZE-STABILIZED SILICA SOL AND ITS USE AS LIQUID FOR PHOSPHATE-BASED EMBEDDING COMPOSITIONS

BACKGROUND OF THE INVENTION

1. Field of the Invention

The present invention relates to a freeze-stabilized aqueous silicic acid sol for use as a liquid constituent for phosphate-based embedding compositions employed in dental technology.

2. Description of the Related Art

Embedding compositions have been sued in dental technology for a long time. They are employed to produce refractory molds for the precision casting of metal articles and are typically composed of mixtures of quartz meal, cristobalite, tridymite, and a binder. For use in connection with metals having a low melting point, the binder is usually a calcium sulfate hemihydrate (gypsum). For use in connection with metals having a high melting point range, the binder is usually a phosphate binder composed of an active magnesium orthophosphate.

In phosphate-bounded investments like those mentioned in the present invention, setting rate is influenced by the ratio of calcined MgO and monoammonium orthophosphate. Grain size and reactivity of the used MgO also influence the setting rate. Expansion upon setting may be directed by adding colloidal silica compounds, See for example, (Dentists Desk Reference; 1. Materials, Instruments and Equipment. 1981, 1st Edit.; American Dental Ass. 2. Guide to Dental Materials and devices 1976; 8th Edit., American Dental Ass.) 3. C. P. Mabie, Journ. Dent. Res. 52 (1) 96 (1973), and 4. U.S. Pat. No. 2,222,781.

If water and/or a commercially available silica sol are added to an embedding composition and the mixture is later heated, the components of the binder react according to the equations listed below and set up to form a highly refractory substance:

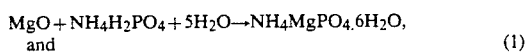
MgO+NH$_4$H$_2$PO$_4$+5H$_2$O→NH$_4$MgPO$_4$.6H$_2$O, and    (1)

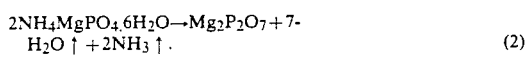
2NH$_4$MgPO$_4$.6H$_2$O→Mg$_2$P$_2$O$_7$+7-H$_2$O↑ +2NH$_3$↑ .    (2)

The setting of an embedding composition is known to be accompanied by a change in volume which may be considerable. The volume change is generally a net increase and is generally due to a combination of expansion due to solidification or setting; thermal expansion, especially expansion of the quartz constituents, particularly cristobalite; and thermal contraction, i.e., cooling of the heated embedding composition.

It is also known in the art that these changes in volume, i.e., expansion capability, can be controlled by changing the concentration of the silica sol constituent. Commercially available silicic sols, i.e., silicic acid sols containing up to 45 weight % colloidal silicic acid in aqueous solution, are therefore frequently used in practice as a liquid constituent for phosphate-based embedding compositions.

Commercially available silicic acid sols are disclosed, inter alia, in Federal Republic of Germany Published Application No. 2,110,058, which corresponds to British Patent No. 1,374,537. In the process disclosed therein, silicic acid sols are not used as a liquid constituent for phosphate-based embedding compositions but as a liquefier for calcium sulphate hemihydrate (gypsum) for products especially suitable for the manufacture of flooring plaster and other building products. These silicic acid sols may be stabilized by the addition of amphoteric metal hydroxides, e.g., hydroxides of aluminum, tin, zinc or lead. At temperatures around the freezing point and below, however, these sols irreversibly precipitate. Even after a single freezing and thawing cycle, a silicic acid sol which has not been freeze-stabilized forms a gel that is incompletely soluble in water. There is practically no redispersion of the colloidal SiO$_2$ upon thawing.

For that reason, attempts have been made to stabilize silicic acid sols with anti-freeze materials, i.e., substances which lower the freezing point. For example, one manufacturer of silica sols furnishes silicic acid sols which contain monoethylene glycol as the anti-freeze material. Although these glycol-containing sols continue to be stable even after repeated freezing and thawing cycles, they are unsuitable as a liquid constituent for phosphate-based embedding substances employed in dental technology because of their unfavorable influence on the expansion behavior of the embedding composition as it sets.

The freeze-stabilization of silicic acid sols, particularly emulsions of wax and coatings (dye mixtures) containing silica sols, is disclosed in U.S. Pat. No. 2,601,291. This patent discloses making silicic acid sols freeze-stable by adding thereto water soluble primary, secondary or tertiary amines. A quantity of from 0.05 to 2.2 mole of amine is added per 100 g SiO$_2$ in the sol. After six freezing and thawing cycles, turbidity of the sol is mentioned to have appeared, but no precipitation of the sol is alleged to have occurred. The above-mentioned silica sols, however, are unsuitable for use in phosphate-based embedding compositions for dental technology because the expansion behavior of the embedding composition is influenced in a disadvantageous manner.

SUMMARY OF THE INVENTION

It is thus an object of the present invention to provide a freeze-stabilized aqueous silicic acid sol which continues to maintain the form of a sol form even after repeated freezing and thawing cycles, i.e., the freeze-stabilized silica sol is substantially unchanged or changed only slightly, and to provide a freeze-stabilized aqueous silicic acid sol which, moreover, does not negatively influence the expansion-upon-setting behavior of embedding compositions including same as a liquid constituent to any substantial extent.

It was unexpectedly discovered that the object of this invention could be accomplished by providing an aqueous silicic acid sol, which is freeze-stabilized and which contains from 25 to 50 weight % silicon dioxide (SiO$_2$) and from 2 to 10 weight % of a compound which is urea and/or a urea derivative and which has the general formula:

wherein X and Y are groups selected from the group consisting of an —NH$_2$ group and an —NHR group in which R represents an alkyl radical having from 1 to 4 carbon atoms. Particularly suitable are silicic acid sols having SiO₂ concentrations of from 35 to 45 weight % and urea and/or urea derivative concentrations of from 5 to 7 weight %. The use of silicic acid sols having a specific surface area according to BET (Brunauer, Emmet, Teller) of from 150 to 250 m²/g, particularly from 180 to 210 m²/g, is advantageous. Particularly good results are obtained with urea and N-methyl urea used alone or in combination. The specific surface area was measured according to the "Einpunkt-Differenzverfahren" by Haul and Dümbgen (DIN 66 132).

The urea and/or urea derivatives are advisably added to the aqueous silicic acid sol in solid form and at room temperature. They are dissolved by stirring. Alternately, they may be added as an aqueous solution.

Advantageously, the silicic acid sols according to the invention can be subjected to repeated freezing and thawing cycles without any substantially adverse influence upon their consistency. If urea is employed as an antifreeze material, for example, no destabilization of the sol is observed after from 15 to 20 freezing and thawing cycles. Moreover, no change in this effect is observed over time, i.e., the freeze-thaw cycled sols do not destabilize upon standing.

A silicic acid sol which contains urea is particularly suitable as a liquid constituent for phosphate-based embedding compositions since, comparing the expansion-upon-setting characteristics of embedding compositions having no urea constituent, these freeze-stabilized sols do not substantially reduce the expansion-upon-setting of the embedding substances. Reduction, if any, is slight. Thus, freeze-stabilized sols can be used to regulate the expansion of the embedding compositions in the same manner as silicic acid sols which have not been freeze-stabilized, i.e., by changing the concentration of the silica sol constituent, since their application-specific characteristics, for example, as a liquifier, are also not influenced to any significant extent.

Although the use of urea as an antifreeze material applied to roads and airport pavement in winter is known, it is clearly not possible to derive therefrom the freeze-stabilizing effect of urea and urea derivatives upon silicic acid sols. This is particularly the case because other antifreeze materials and/or thawing agents employed in commercially available silicic acid sols, for example, glycols, do not satisfactorily achieve the object of the present invention.

The present invention additionally encompasses an embedding composition which is phosphate-based and which is useful in dental technology to produce refractory molds for precision casting of metal articles, the embedding composition including a binder which is phosphate-based; and an aqueous silicic acid sol which is freeze-stabilized and which comprises from 25 to 50 weight percent of silicon dioxide; and from 2 to 10 weight % of a compound which is urea or a urea derivative and which has the general formula:

wherein X and Y are selected from the group consisting of an —NH₂ group and an —NHR group, and wherein R is an alkyl radical having from 1 to 4 carbon atoms.

The present invention thus teaches the process of freeze-stabilizing an aqueous silicic acid sol comprised of from 25 to 50 weight % of silicon dioxide, the process including the step of including in the silicic acid sol, as an antifreeze material, from 2 to 10 weight % of a compound which is urea or a urea derivative and which has the general formula:

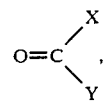

wherein X and Y are groups selected from the group consisting of an —NH₂ group and an —NHR group, and wherein R is an alkyl radical having from 1 to 4 carbon atoms.

The present invention additionally teaches the process of controlling expansion-upon-setting of a phosphate-based embedding composition comprised of an aqueous silicic acid sol having from 25 to 50 weight % of silicon dioxide, the process including the step of including in the aqueous silicic acid sol, as an antifreeze material, from 2 to 10 weight % of a compound which is urea or a urea derivative and which has the general formula:

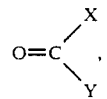

wherein X and Y are groups selected from the group consisting of an —NH₂ group and an —NHR group, in which R is an alkyl radical having from 1 to 4 carbon atoms.

DESCRIPTION OF THE PREFERRED EMBODIMENTS

The invention will be described in greater detail below by way of the following examples.

EXAMPLES 1–5

Into respective aqueous silicic acid sols each having an SiO₂ concentration of 40 weight % and a specific surface area according to BET of about 200 m²/g, 6 weight % of the following additives were dissolved at room temperature (21° C. ±2° C.):

Example 1. none (control)
Example 2. urea;
Example 3. N-methyl urea;
Example 4. N-ethyl urea; and
Example 5. N,N'-dimethyl urea.

The trademark of silicic acid sols produced by Bayer AG, is Kieselsol 200/40%.

The samples were cooled for 20 hours in a freezer together with a sample of pure silica sol ( Example 1, control). Cooling down to −15° C. caused all of the samples to become solid. The samples were then heated and after heating to room temperature, the pure silica sol without additive (Example 1, control) formed a colorless, opaque and gel-like mass. The mixtures of Example 2–5, i.e., the aqueous silica sols with the named additives, were returned to their original liquid state, i.e., the state before freezing, without any detectable change. The freezing and thawing cycle was repeated twenty time and the number of freeze-thaw cycles required to obtain a gel-like mass was observed for each of the mixtures of Example 2-5. the following results were obtained:

TABLE I

| Example No. | Additive | Number of Cycles To Gel |
|---|---|---|
| (1) | None (Control) | 1 |
| (2) | urea: | >20* |
| (3) | N-methyl urea | 4 |
| (4) | N-ethyl urea | 5 |
| (5) | N,N'-dimethyl urea | 6 |

*No gel-like residue even after 20 cycles.

COMPARATIVE EXAMPLES 6–9

Into respective 100 g portions of an embedding composition, Gilvest EHT, Which is manufactured by Giulini Chemie GmbH and which is a mixture of cristobalite, quartz and magnesium oxide (mgO) and monoammonium orthophosphate, were mixed with 21 ml of the following silica sols, each having an $SiO_2$ concentration of 40 weight % and each having a specific surface area according to BET of about 200 m$^2$/g, as follows:

Example 6. (Control) Silica sol without freeze-stabilizer, Bayer silica sol 200 manufactured by Bayer AG;

Example 7. Freeze-stabilized silica sol according to the prior art, Bayer silica sol 200 S containing 5 weight % of monoethylene glycol;

Example 8. Freeze-stabilized silica sol according to the prior art, Bayer silica sol 200 S containing 4 weight % of monoethylene glycol; and Example 9. Freeze-stabilized silica sol according to the invention, containing 6 weight % urea.

The expansion-upon-setting was measured at room temperature (21° C. ±2° C.) according to DIN [German National Standard] 13,911 in an extensometer having a trough of 100 mm length. Expansion was measured after 1 hour and after 2 hours. The following results were obtained:

TABLE II

| | Ex. 6 (Control) | Ex. 7 | Ex. 8 | Ex. 9 |
|---|---|---|---|---|
| 1 hour | 2.36 | 1.21 | 1.09 | 2.09 |
| 2 hours | 2.50 | 1.29 | 1.16 | 2.15 |

As the table shows, the expansion behavior of an embedding composition is reduced only slightly by the silica sol stabilized according to the invention, Example 9, (11.4% after 1 hr; 14.0% after 2 hrs.) compared to control Example 6, thus significantly facilitating and improving work in dental technology. Such a small reduction in expansion-upon-setting is considered to not constitute a substantially negative influence and this advantageous result is in contrast to a significant reduction in expansion for freeze-stabilized silica sol according to the prior art (Examples 7 and 8) for which expansion after 1 hour was reduced 48.7% and 53.8%, respectively, and after 2 hours, 48.4% and 53.6%, respectively.

The present disclosure relates to the subject matter disclosed in European Patent Application No. 88105248.4, filed Mar. 31st, 1988, the entire specification of which is incorporated herein by reference.

It will be understood that the above description of the present invention is susceptible to various modifications, changes and adaptations, and the same are intended to be comprehended within the meaning and range of equivalents of the appended claims.

We claim:

1. An aqueous silicic acid sol which is freeze-stabilized by inclusion therein of an antifreeze material and which is useful in dental technology for the production of phosphate-based embedding compositions, the aqueous silicic acid sol comprising:

water;

from 25 to 50 weight percent of silicon dioxide; and from 2 to 10 weight % of a compound which functions as an antifreeze material, which is one of urea or a urea derivative, and which has the general formula:

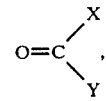

wherein X and Y are groups selected from the group consisting of an —NH$_2$ group and an —NHR group in which R is an alkyl radical having from 1 to 4 carbon atoms.

2. The aqueous silicic acid sol as defined in claim 1, containing from 5 to 7 weight % of said compound.

3. The aqueous silicic acid sol as defined in claim 2, wherein said compound is urea.

4. The aqueous silicic acid sol as defined in claim 2, wherein said compound is a urea derivative selected from the group consisting of N-methyl urea, N-ethyl urea, N,N'-dimethyl urea, and mixtures thereof.

5. The aqueous silicic acid sol as defined in claim 2, containing from 35 to 45 weight % of silicon dioxide.

6. The aqueous silicic acid sol as defined in claim 5, wherein said compound is urea.

7. The aqueous silicic acid sol as defined in claim 5, wherein said compound is a urea derivative selected from the group consisting of N-methyl urea, N-ethyl urea, N,N'-dimethyl urea and mixtures thereof.

8. The aqueous silicic acid sol as defined in claim 1, containing from 35 to 45 weight % of silicon dioxide.

9. The aqueous silicic acid sol as defined in claim 8, wherein said compound is urea.

10. The aqueous silicic acid sol as defined in claim 8, wherein said compound is a urea derivative selected from the group consisting of N-methyl urea, N-ethyl urea, N,N'-dimethyl urea, and mixtures thereof.

11. The aqueous silicic acid as defined in claim 1, wherein said compound is a urea derivative selected from the group consisting of N-methyl urea, N-ethyl urea, N,N'-dimethyl urea, and mixtures thereof.

12. The aqueous silicic acid sol as defined in claim 1, wherein said compound is N-methyl urea.

13. The aqueous silicic acid sol as defined in claim 1, wherein said compound is N-ethyl urea.

14. The aqueous silicic acid sol as defined in claim 1, wherein said compound is N,N'-dimethyl urea.

15. The aqueous silicic acid sol as defined in claim 1, wherein said compound is urea.

16. An embedding composition which is phosphate-based and which is useful in dental technology to produce refractory molds for precision casting of metal articles, the embedding composition comprising:

a binder which is phosphate-based; and an aqueous silicic acid sol which is freeze-stabilized by inclusion therein of an antifreeze material and which comprises:

water;

from 25 to 50 weight percent of silicon dioxide; and from 2 to 10 weight % of a compound which functions as an antifreeze material, which is one of urea or a urea derivative, and which has the general formula:

wherein X and Y are groups selected from the group consisting of an —NH$_2$ group and an —NHR group in which R is an alkyl radical having from 1 to 4 carbon atoms.

17. The process of freeze-stabilizing an aqueous silicic acid sol comprised of water and from 25 to 50 weight % of silicon dioxide, the process comprising:
admixing in the aqueous silicic acid sol from 2 to 10 weight % of a compound which functions as an antifreeze material, which is one of urea or a urea derivative, and which has the general formula:

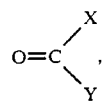

wherein X and Y are groups selected from the group consisting of an —NH$_2$ group and an —NHR group in which R is an alkyl radial having from 1 to 4 carbon atoms.

18. The process of controlling expansion-upon-setting of a phosphate-based embedding composition comprised of an aqueous silicic acid sol including water and from 25 to 50 weight % of silicon dioxide, the process comprising:
admixing in the aqueous silicic acid sol from 2 to 10 weight % of a compound which functions as an antifreeze material, which is one of urea or a urea derivative, and which has the general formula:

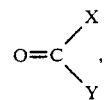

wherein X and Y are groups selected from the group consisting of an —NH$_2$ group and an —NHR group in which R is an alkyl radical having from 1 to 4 carbon atoms.

* * * * *